(12) United States Patent
Keller (10) Patent No.: US 8,564,978 B2
(45) Date of Patent: Oct. 22, 2013

(54) APPARATUS FOR SUPPLYING ISOLATED REGULATED DC POWER TO ELECTRONICS DEVICES

(75) Inventor: Anton Werner Keller, Arni (CH)

(73) Assignee: Thomson Licensing, Boulogne-Billancourt (FR)

(*) Notice: Subject to any disclaimer, the term of this patent is extended or adjusted under 35 U.S.C. 154(b) by 728 days.

(21) Appl. No.: 12/450,052

(22) PCT Filed: Mar. 22, 2007

(86) PCT No.: PCT/IB2007/000716
§ 371 (c)(1),
(2), (4) Date: Sep. 9, 2009

(87) PCT Pub. No.: WO2008/114073
PCT Pub. Date: Sep. 25, 2008

(65) Prior Publication Data
US 2010/0046252 A1    Feb. 25, 2010

(51) Int. Cl.
*H02M 3/335* (2006.01)
(52) U.S. Cl.
USPC ............. 363/21.07; 363/95; 363/97; 363/131
(58) Field of Classification Search
USPC ................. 363/20, 21, 21.07, 95, 97, 131, 363/21.12–21.18
See application file for complete search history.

(56) References Cited

U.S. PATENT DOCUMENTS

| | | | |
|---|---|---|---|
| 4,622,586 A * | 11/1986 | Megeid | 348/532 |
| 5,304,917 A | 4/1994 | Somerville | |
| 5,583,421 A | 12/1996 | Barbehenn et al. | |
| 6,134,123 A * | 10/2000 | Yamada | 363/21.13 |
| 6,172,885 B1 | 1/2001 | Feldtkeller | |
| 6,714,063 B2 * | 3/2004 | Nishizono | 327/345 |
| 7,023,183 B1 | 4/2006 | Keller | |

(Continued)

FOREIGN PATENT DOCUMENTS

| JP | 63-007994 U | 1/1988 |
|---|---|---|
| JP | 11-69812 A | 3/1999 |

(Continued)

OTHER PUBLICATIONS

Electronics: "Capacitive Coupling Simplifies Isolation," VNU Business Publications, NY, USA, vol. 59, No. 37, Dec. 1986, pp. 84-85.

(Continued)

*Primary Examiner* — Adolf Berhane
*Assistant Examiner* — Yemane Mehari
(74) *Attorney, Agent, or Firm* — Robert D. Shedd; Sammy S. Henig (57) ABSTRACT

Embodiments of the invention provide an off line DC-DC converter comprising a transformer (180) coupled to a monolithic integrated circuit (400). The transformer applies an input supply DC voltage (Vin) applied to a primary winding (181) of the transformer to produce an output supply DC voltage provided from a secondary winding (182). The monolithic integrated circuit (400) comprises a switching regulator including a switch (151) and a switch controller (100) on a first portion of the monolithic integrated circuit. A capacitive isolator (201) is provided on a second portion of the monolithic integrated circuit. The monolithic integrated circuit regulates the output supply DC voltage and isolates the output supply DC voltage from the input supply DC voltage with respect to electrical shock hazard.

9 Claims, 6 Drawing Sheets

(56) References Cited

U.S. PATENT DOCUMENTS

| | | |
|---|---|---|
| 7,773,392 B2 | 8/2010 | Matsumoto |
| 7,864,546 B2 * | 1/2011 | Dhuyvetter et al. ............ 363/17 |
| 2002/0196642 A1 | 12/2002 | Goder et al. |
| 2006/0071237 A1 | 4/2006 | Deboy et al. |

FOREIGN PATENT DOCUMENTS

| | | |
|---|---|---|
| JP | 11-122090 A | 4/1999 |
| JP | 2005-512486 A | 4/2005 |
| WO | 03/049267 A2 | 6/2003 |
| WO | 2007/018227 A1 | 2/2007 |

OTHER PUBLICATIONS

Zirngast: "Capacitive Isolation Expands Analogue Design Options—Part 2," Electronic Engineering, Morgan-Grampian LTD. London, GB, vol. 61, No. 749, May 1, 1989, pp. 33,36,38,40.

International Search Report, dated Nov. 23, 2007.

* cited by examiner

APPARATUS FOR SUPPLYING ISOLATED REGULATED DC POWER TO ELECTRONICS DEVICES

This application claims the benefit, under 35 U.S.C. §365 of International Application PCT/IB2007/000716 filed Mar. 22, 2007, which was published in accordance with PCT Article 21(2) on Sep. 25, 2008 in English.

FIELD OF THE INVENTION

The invention relates to power supplies and more particularly to apparatus and methods for converting offline DC power provided at a first level to isolated regulated DC power at a second level suitable for powering an electronic device.

BACKGROUND OF THE INVENTION

Many of today's electronic devices are powered by direct current (DC) derived from an alternating current (AC) main power source. An AC to DC converter converts the AC power to a first DC voltage or current for powering the device. Many of these devices, for example, personal computers and televisions, are configured for coupling auxiliary devices thereto. In some cases an auxiliary electronics device operates using a second DC voltage or current different than the first DC voltage or current. In that case DC-DC converters are employed to convert the first DC voltage or current (i.e., the offline DC voltage) to the second DC voltage or current for powering the auxiliary device.

Regulation and isolation of the second DC voltage or current is desirable and is provided by conventional DC-DC converter circuits. However these DC-DC converter features have conventionally been implemented with custom-designed power controller circuits and components. In particular, conventional power controller circuits rely on optical couplers or isolating signal transformers to isolate the primary and secondary windings of an isolation transformer. Both solutions comprise discrete circuit components and are not suitable for implementing on monolithic integrated circuits. As a result conventional circuits typically comprise a plurality of discrete components, a plurality of integrated circuits and in some cases hybrid ICs to provide converter functions. While these circuits perform their functions well, they consume more space than is typically desirable. In addition they can be complex and expensive. It would therefore be desirable to provide an isolated off line power controller that could be integrated onto a single monolithic integrated circuit.

SUMMARY OF THE INVENTION

Embodiments of the invention provide a power supply device comprising a transformer coupled to a monolithic integrated circuit. The transformer converts a first DC voltage applied to a primary winding of the transformer to a second DC voltage provided at a secondary winding of the transformer. The monolithic integrated circuit comprises a switching regulator including a switch and a switch controller on a first portion of the monolithic integrated circuit. An isolator is provided on a second portion of the monolithic integrated circuit. The monolithic integrated circuit regulates the second DC signal and isolates the second DC signal from the first DC signal.

BRIEF DESCRIPTION OF THE DRAWINGS

Preferred embodiments of the present invention will be described below in more detail with reference to the accompanying drawings in which.

DETAILED DESCRIPTION

For purposes of this specification the term "DC signal" is synonymous with the terms "DC voltage", "DC current" and "DC power. Conventional off-line switched-mode power supplies (SMPS) comprising direct current (DC) to DC converters are known. In a conventional offline DC-DC converter a first DC signal is typically obtained by rectifying and filtering an alternating current (AC) power source, such as that supplied by a power line. The AC power source is also referred to herein as a mains supply. In an isolated DC-DC converter the first DC signal is provided to a primary winding of a transformer. A power switch, typically a power transistor, is coupled to the primary side of the transformer and referenced to a first common potential, for example, ground. A second DC signal is induced in the secondary winding of the transformer by the action of the power switch starting and stopping current flow in the primary winding.

A feedback circuit is coupled to the power supply output at the secondary winding of the transformer to sample the second DC signal and to provide a feedback signal indicating a difference between the second DC signal and a desired reference DC level. An optical coupler couples the feedback signal from feedback circuit on the secondary side of the transformer to a switch regulator. The switch regulator controls the power transistor. The isolator provides isolation between the primary and secondary windings of the transformer.

Conventional off line DC-DC converters are readily commercially available. For example ON semiconductors provides a regulated isolated second DC signal at an output.

FIG. 1

Figure 1:
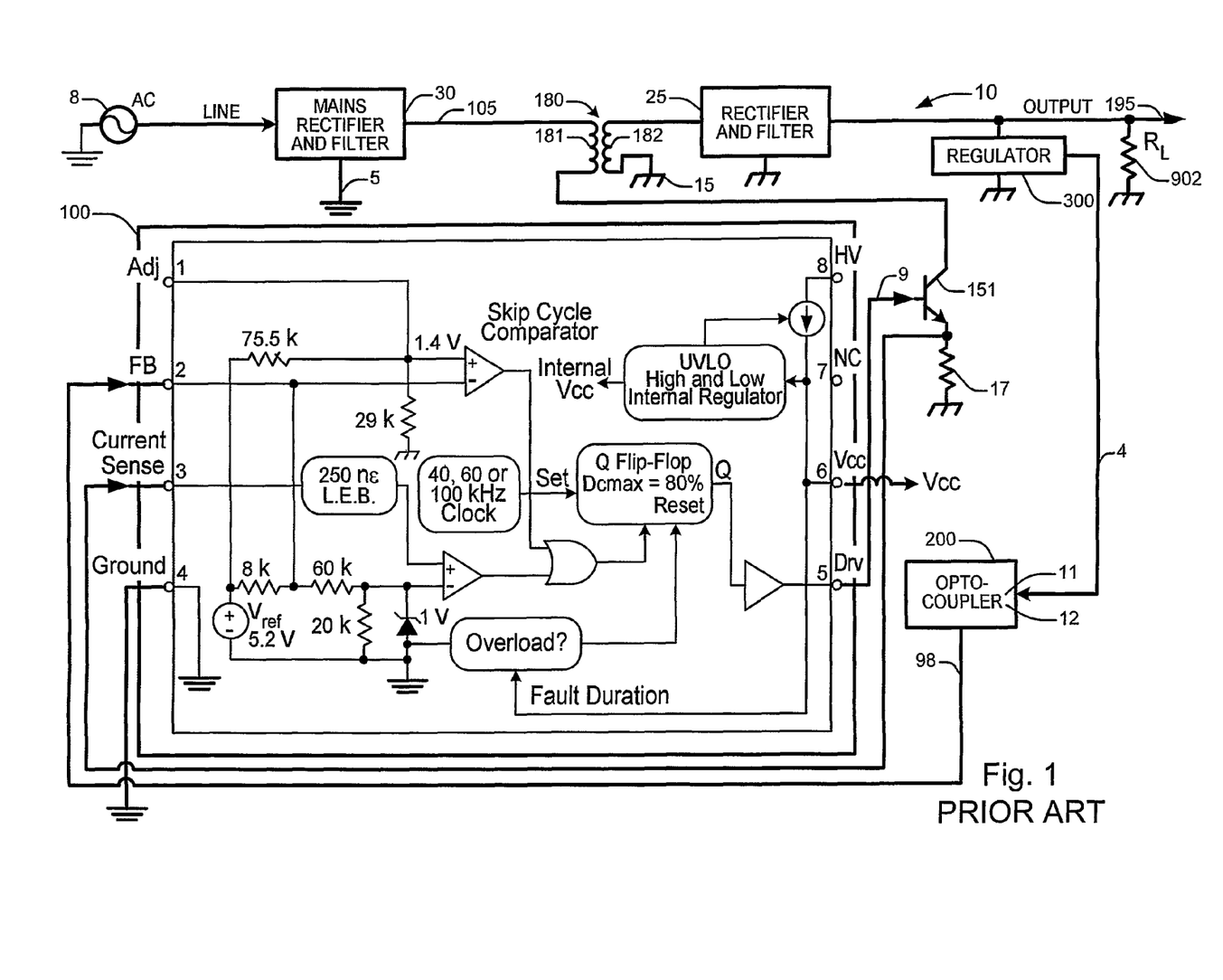
FIG. 1 is a block diagram of a conventional DC-Dc converter according to the prior art.

FIG. 1 shows an example conventional switch mode power supply (SMPS) comprising a DC-DC converter 10. DC-DC converter 10 of FIG. 1 comprises a transformer 180 including a primary winding 181 and a secondary winding 182. DC-DC converter 10 further comprises a switch 151 and a switch controller 100. DC-DC converter 10 further comprises a regulator 300 coupled to secondary winding 182 of transformer 180 and an optical coupler 200 coupled between a converter output 195 and controller 100.

A converter input 105 is coupled to a power source 30. In the example illustrated in FIG. 1 power source 30 comprises a mains rectifier and filter 30 providing a rectified and filtered first DC voltage at converter input 105. Input 105 is coupled to one end of a primary winding 181 of transformer 180. Switch 151 is coupled between the other end of primary winding 181 and a first reference potential, for example ground 5, via a current sensing resistor 17. A current sense output 7 is provided by resistor 17 and coupled to an input of controller 100. An output of controller 100 is coupled to switch 151 to operate switch 151.

DC-DC converter 10 provides a second DC voltage at a converter output 195. Converter output 195 is coupled to one end of secondary winding 182 of transformer 180. The other end of secondary winding 182 of transformer 180 is referenced to a second reference potential 15. Regulator 300 is coupled to secondary winding 182 of transformer 180 to sense second DC voltage at output 195 and to provide a feedback signal 4 representative of second DC voltage 195 referenced to second reference potential 15. Optical coupler 200 comprises a light emitting element 11 and a light sensing element 12. Light emitting element 11 is coupled to output 195 to receive first feedback signal 4 and to emit light in accordance with feedback signal 4. Light emitting element 11 is coupled to second reference potential 15.

Light receiving element 12 receives light emitted by light emitting element 11. Light receiving element 12 provides a signal in accordance with the received light to an input of switch controller 100. The signal provided to controller 100 by light receiving element 12 is referenced to first reference potential 5. An output of switch controller 100 operates switch 151 to control current in primary winding 181 of transformer 180.

In that manner information about second DC voltage at output 195 on the secondary side 182 of transformer 180 is provided to controller 151 on the primary side 181 of transformer 180 by means of an optical coupler 200. At the same time optical coupler 200 provides isolation between the primary winding 181 and the secondary winding 182 of transformer 180 regardless of the difference between first reference potential 5 and second reference potential 15.

Common configurations of the DC-DC converter illustrated in FIG. 1 are implemented using at least two separately packaged circuits. One package is a monolithic IC comprising controller 100. A different package comprises optical coupler 200. In some configurations a third package comprises regulator 300.

Thus conventional DC-DC converters rely upon a plurality of separately packaged circuits to provide the functions of controller 100. In particular it would be desirable to provide isolation between primary and secondary windings of transformer 180 by providing an isolator on a monolithic integrated circuit along with other functions of DC-DC converter 10.

FIG. 2

Figure 2:
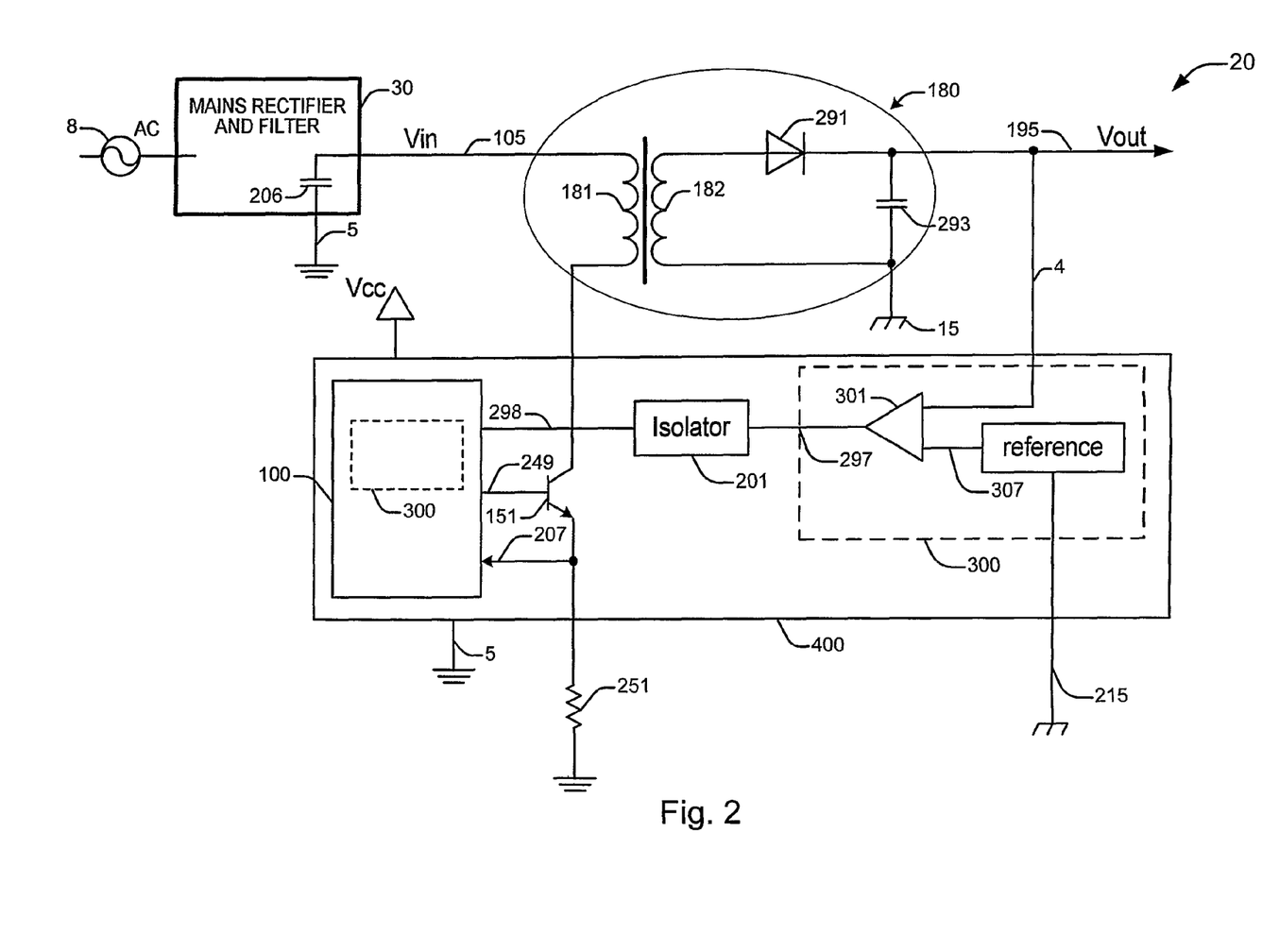
FIG. 2 is a block diagram of a DC-DC converter according to an embodiment of the invention.

The block diagram of FIG. 2 illustrates a power supply device 20 according to an embodiment of the invention. Device 20 comprises a transformer circuit 180 coupled to a monolithic integrated circuit 400. Transformer circuit 180 comprises a primary side including primary winding 181 and a secondary side comprising secondary winding 182, rectifier 291 and capacitor 293. A first rectified DC supply voltage Vin is applied to primary winding 181 at a power supply device input 105. Voltage Vin is referenced to a first common potential 5, referred to generally as hot ground. First common potential 5 may be common to circuits coupled to the primary side of transformer 180.

A power supply device output 195 develops from a voltage produced in a secondary winding 182 an output supply second DC voltage Vout. Voltage Vout is referenced to a second common potential 15, referred to generally as cold ground or chassis ground. Voltage Vout might be used for energizing electronic devices, not shown. The secondary side of transformer circuit 180 includes a rectifier 291 coupled to secondary winding 182 and capacitor 293 coupled between rectifier 291 and second common potential 15 in a conventional manner. In some embodiments the chassis common potential is common to circuits comprising devices. In other embodiments of the invention second reference potential 15 comprises a common reference potential for circuits supplied with power by the secondary side of transformer 180.

Monolithic integrated circuit 400 comprises a power switch 151, a switch regulator 100 and an isolator 201. In one embodiment of the invention power switch 151 is implemented on a first portion of monolithic integrated circuit 400. Switch regulator 100 is implemented on a second portion of monolithic integrated circuit 400. Isolator 201 is implemented on a third portion of monolithic integrated circuit 400. Regulator circuit 300 is implemented on a fourth portion of monolithic integrated circuit 400. It will be readily appreciated by those of ordinary skill in the art upon reading this specification that monolithic integrated circuits are fabricated such that some circuit portions overlap or are intertwined with other circuit portions in various arrangements convenient for fabrication of the monolithic integrated circuit. Therefore first, second and third and fourth portions of monolithic integrated circuit 400 described herein do not necessarily comprise individual circuit components physically separate from one another on the monolithic integrated circuit.

In some embodiments of the invention switch regulator 100 is packaged with feedback circuit 300. In other embodiments of the invention at least a portion of feedback circuit 300 is packaged separately from switch regulator 100. Feedback circuit 300 is coupled to a power supply output 195 to sense second DC voltage Vout. Feedback circuit 300 provides a feedback signal 297 based upon the level of second DC signal voltage Vout. In alternative embodiments of the invention Integrated converter circuit 400 comprises a single monolithic integrated circuit chip comprising switch controller 100, feedback circuit 300 and isolator 201. In some alternative embodiments switch 151 is provided as a separate component. In other embodiments of the invention isolator 201 is provided on a monolithic integrated circuit chip comprising isolator 201 and at least one circuit configured to provide functions selected from the group, switch controller 100, switch 151, and regulator 300.

In operation, a first DC voltage Vin is provided to power supply device 20 at a device input 105. First DC voltage Vin is provided, for example, by coupling device input 105 to a rectified and filtered voltage provided by a conventional AC mains power supply 8 that is, for example, at 60 or 50 Hz. Voltage Vin is coupled to one end of primary winding 181 of transformer 180. Smoothing of the rectified mains AC supply is provided by a capacitor 206 in a conventional manner. Capacitor 206 forms a conventional smoothing capacitor. The other end of primary winding 181 is coupled to a first common potential 5 or hot ground, via switch 151. First common potential 5 comprises earth ground in one embodiment of the invention. In other embodiments of the invention first common potential 5 comprises a potential reference for primary side circuits of transformer 180.

Switch 151 comprises, for example a conventional chopper transistor typical of those employed in switch mode power supplies. In one embodiment of the invention switch 151 comprises a semiconductor device selected from the group comprising, bipolar transistors, field effect transistors (FET) and Metal Oxide Semiconductor Field Effect Transistors (MOSFET). A wide variety of semiconductor devices are known and commercially available for implementing switch 151 on a semiconductor substrate to comprise monolithic integrated circuit 400 of power supply device 20. In the embodiment of the invention illustrated in FIG. 2 switch 151 comprises a bi-polar transistor.

The operation of switch 151 is controlled by switch controller 100. Controller 100 controls the operation of switch 151 by driving switch 151 to periodically energize primary winding 181 of transformer 180 in a conventional manner.

After switch 151 is turned off energy is transferred from primary winding 181 to secondary winding 182 of transformer 180. A first end of secondary winding 182 is coupled to rectifier 291. The transferred energy is rectified by diode 291 and stored in capacitor 293 in a conventional manner to provide output voltage Vout at device output 195.

A feedback circuit 300 compensates for variations in Vout due to changing load conditions (e.g., load $R_L$ of FIG. 1). In the embodiment illustrated in FIG. 2 feedback circuit 300 comprises a comparing circuit 301 and a reference DC signal 307. Comparing circuit 301 includes a first input coupled to receive voltage Vout to provide a level indicating signal 4 to comparing circuit 301. Comparing circuit 301 compares level indicating signal 4 (indicating the level of DC voltage Vout) to a reference signal 307. Comparing circuit 301 provides a feedback signal 297 at its output.

Feedback signal 297 is representative of variations in second DC voltage Vout with respect to the level of reference signal 307. In that regard, feedback signal 297 comprises an error signal. Feedback signal 297 is coupled to isolator 201. Isolator 201 couples the feedback signal to a switch regulator circuit 100. Switch regulator 100 operates in a conventional manner. If there is an error in second DC voltage Vout, switch regulator 100 compensates by adjusting the switching (on and off) and switch timing of switch 151 in a conventional manner.

One end of secondary winding 182 of transformer 180 is coupled to second common potential 15. Therefore it is possible for a significant potential difference to exist between first common potential 5 and second common potential 15. For that reason a conventional converter typically couples the feedback signal for regulation purposes via an optical isolator. Unfortunately, optical isolators cannot practically be provided on a monolithic integrated circuit.

The monolithic integrated circuit 400 illustrated in FIG. 2 comprises an isolator 201 configured in accordance with embodiments of the invention. Unlike conventional isolators, isolator 201 does not rely on optical circuit elements for coupling feedback signal 298 from the secondary side of transformer 180 to the primary side of transformer 180. Instead isolator 201 comprises capacitive elements arranged in accordance with principles of the invention. Thus, according to an embodiment of the invention isolator 201 is provided on monolithic integrated circuit 400.

FIG. 3

Figure 3:
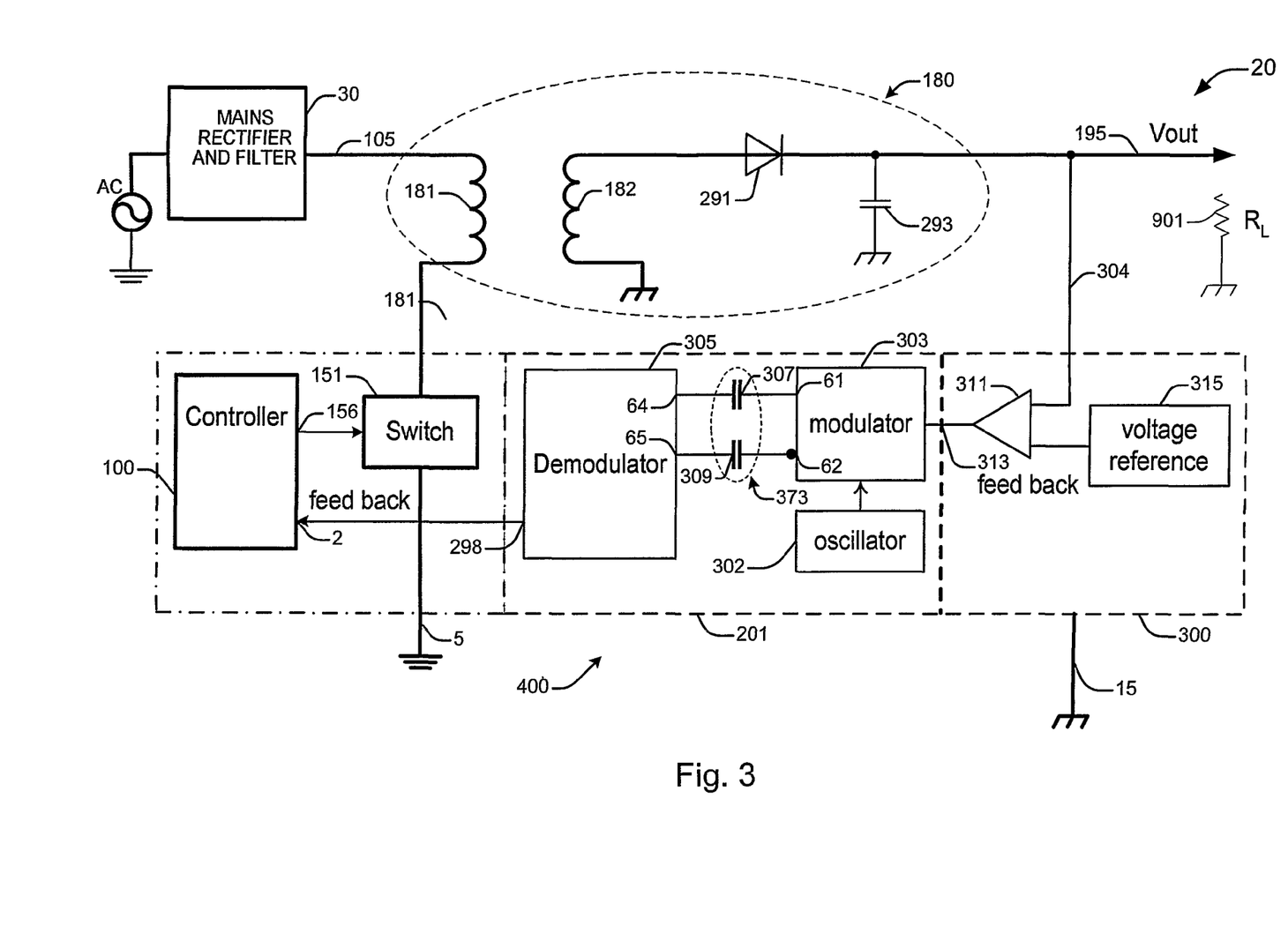
FIG. 3 is a block diagram of a DC to Dc converter according to an embodiment of the invention.

FIG. 3 is a block diagram illustrating further details of isolator 201 of monolithic integrated circuit 400 according to an embodiment of the invention. As illustrated in FIGS. 2 and 3 a power supply device 20 comprises a transformer circuit 180 coupled to a monolithic integrated converter circuit 400. Monolithic integrated circuit 400 includes a switch 151 and a switch controller 100, a feedback circuit 300 and an isolator 201. In the embodiment illustrated in FIG. 3 isolator 201 comprises a modulator 303, a capacitive isolating element 373 comprising first and second capacitors 307 and 309 respectively, and a demodulator 305. Modulator 303 is coupled to comparing circuit 311 to receive feedback signal 313. Modulator 303 includes an oscillator 302. Modulator 303 modulates a carrier signal provided by oscillator 302 with feedback signal 313. Capacitor 307 couples an alternating current (AC) modulated signal to an input 64 of a demodulator 305. According to the embodiment of the invention illustrated in FIG. 3, a first output 61 of modulator 303 is coupled to one side of capacitor 307. A second output 62 of modulator 305 is coupled to one terminal of a capacitor 309. The other terminal of capacitor 309 is coupled to an input 65 of demodulator 305. Thus, the modulated signal is coupled via capacitors 307 and 309 to demodulator 305. The signals produced at first output 61 and second output 62 are complementary signals that are inverted with respect to each other. Capacitors 307 and 309 might be either internal, on chip capacitors (monolithic) or external to the integrated circuit. External capacitors would, advantageously, allow using specially rated capacitors at the associated cost of four additional pins used.

An output 298 of demodulator 305 applies a signal that contains information derived from feedback signal 313 to a feedback input 2 of controller 100. Controller 100 provides a drive signal 156 to switch 151. The drive signal 156 causes switch 151 to switch on and off at a rate determined by feedback signal 313. According to embodiments of the invention controller 100 is configured in accordance with commercially available switch mode controller arrangements. Conventional controller arrangements are described, for example, by ON-semiconductor (NCP1200). According to one embodiment of the invention other elements of controller 100 are configured in accordance with conventional switch mode controller techniques. However, in contrast to known SMPS techniques isolator 201 does not rely on optical components to provide isolation between primary winding 181 and secondary winding 182 of transformer 180.

According to embodiments of the invention feedback signal 313 is modulated on a carrier by modulator 303. The modulated signal is coupled via capacitors 307 and 309 from modulator 303 to demodulator 305. Demodulator 305 recovers the error information contained in feedback signal 313 from the modulated signal and provides the recovered feedback signal to input 2 of controller 100. Isolator 201 arrangement illustrated in FIG. 3 provides a high noise immunity for power supply device 20. This can be attributed, at least in part, to the symmetry provided by the circuits comprising isolator 201. The differential drive provided via capacitors 307 and 309 provides, advantageously, noise cancellation by common mode rejection.

Isolation is required between hot ground potential 5 and cold ground potential 15 at low frequencies such as, for example, 50 or 60 Hz to prevent the possibility of, for example, electrical shock hazard. Capacitors 307 and 309 form a high impedance at the low frequencies. Thereby, capacitors 307 and 309 provide isolation in the feedback signal path between hot ground potential 5 and cold ground potential 15. The frequency of the signal that is coupled via capacitors 307 and 309 is selected to be higher than the frequencies in which isolation has to be provided by capacitors 307 and 309. Thus, capacitors 307 and 309 form a low impedance at the frequency of the signals produced at output 61 and 62 of modulator 303, respectively. Therefore, the signals produced at output 61 and 62 of modulator 303, respectively, pass without being blocked by capacitors 307 and 309.

Figure 4A:
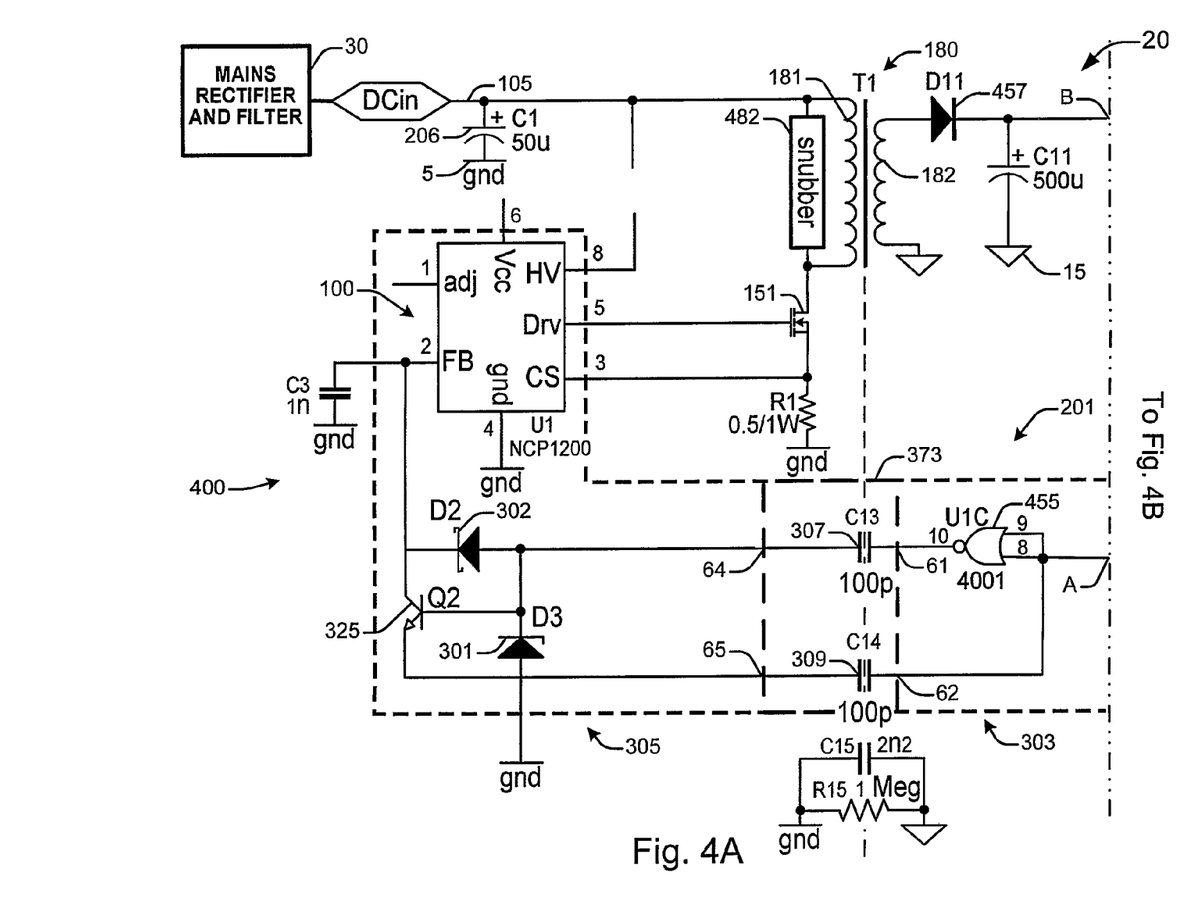
FIG. 4 is a schematic diagram representing a circuit according to an embodiment of the invention.
Figure 4B:
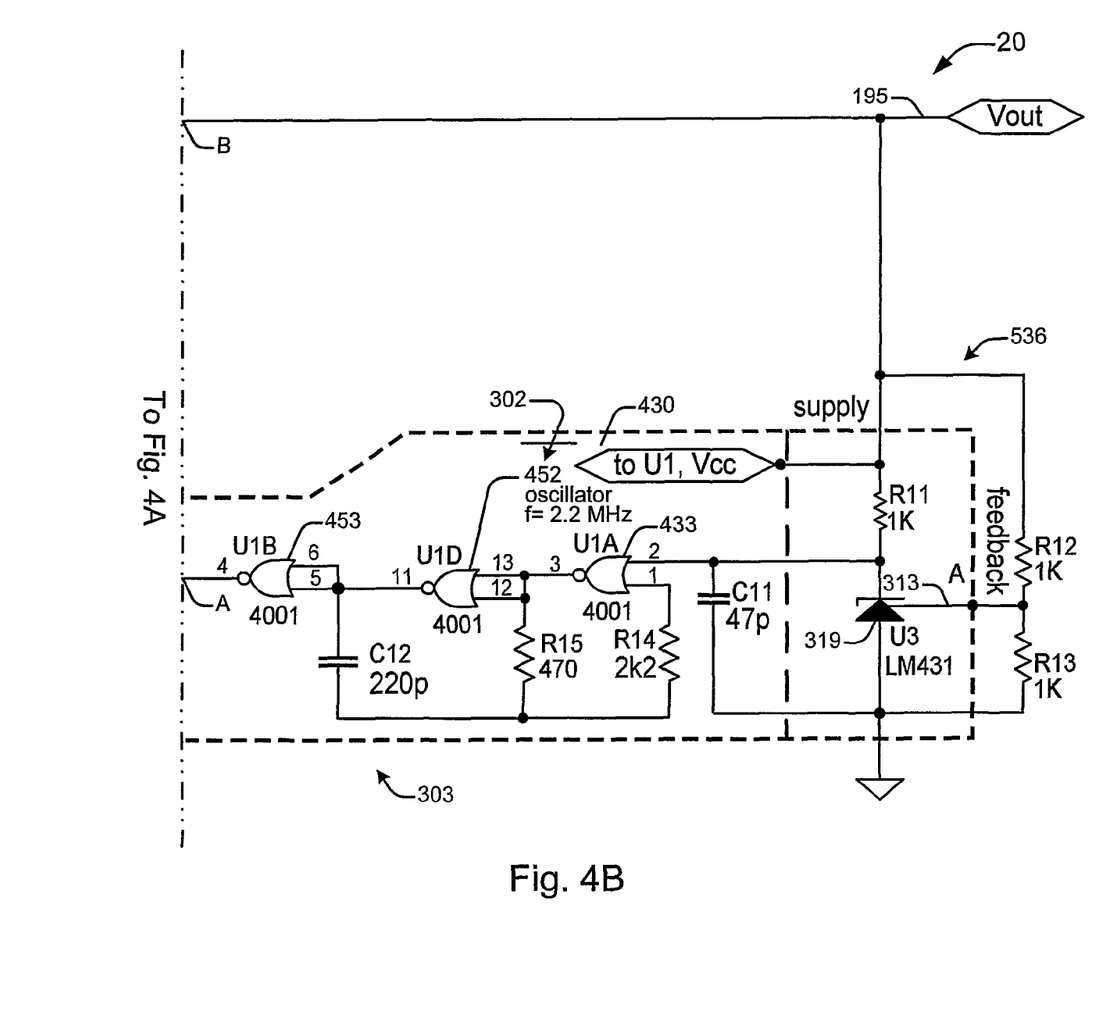

In one embodiment of the invention modulator 303 modulates a carrier signal by feedback signal 313. One example modulation circuit arrangement is illustrated in FIG. 4. Alternative embodiments of the invention employ other types of modulation to impress feedback signal 313 on a carrier signal. Embodiments of the invention select isolating capacitors 307 and 309 at ratings in accordance with safety considerations and in compliance with any applicable safety regulations.

FIG. 4

FIG. 4 is a block diagram illustrating a power supply device 20 configured in accordance with an embodiment of the invention. As previously described with respect to FIG. 3 a transformer circuit 180 is coupled to a monolithic integrated circuit 400. Transformer 180 provides isolation between hot ground potential 5 and cold ground potential 15 in the power transfer path. Transformer circuit 180 optionally includes a snubber circuit 482 coupled across primary winding 181. In the embodiment of the invention illustrated in FIG. 4 switch 151 is provided external to monolithic integrated circuit 400.

Switch controller 100 is provided on a first portion of monolithic integrated circuit 400. Accordingly, in the embodiment of the invention illustrated in FIG. 4, switch 151 is coupled to switch controller 100 at a driver output terminal 156 of monolithic integrated circuit 400.

An error signal generating circuit 536 comprising a voltage divider is coupled to a first terminal A of monolithic integrated circuit 400. First terminal A couples feedback signal 313 to modulator 303 of monolithic integrated circuit 400. Modulator 303 is implemented on monolithic integrated circuit 400. According to an embodiment of the invention modulator circuit 303 comprises a start-stop oscillator 302 and first and second inverters 453 and 455 respectively. In one embodiment of the invention start-stop oscillator 302 comprises first NOR gate 452 and second NOR gate 433. Start-stop oscillator 302 is gated by the signal at pin 2 of NOR gate 433. The voltage at pin 2 is pulled up by a resistor R11.

Feedback signal 313 is coupled to a device 319. Device 319 is configured to operate as a controllable zener diode circuit with a third pin for receiving feedback signal 313. When feedback signal 313 on the third pin drops below the device 319 threshold, indicating that voltage Vout is too low, device 319 produces a voltage level that forms a logical HIGH at pin 2 of NOR gate 433. Consequently, start-stop oscillator 302 is disabled. On the other hand, when feedback signal 313 on the third rises over above the device 319 threshold, indicating that voltage Vout is excessive, device 319 produces a voltage level that forms a logical LOW at pin 2 of NOR gate 433. Consequently, start-stop oscillator 302 is enabled to operate at a frequency of about 2 MHz. Thus, modulator 303 modulates oscillator 302 in accordance with feedback signal 313 to provide a modulated feedback signal at pin 11 of NOR gate 452. In the embodiment of the invention illustrated in FIG. 4 modulator 303 is provided on a portion of monolithic integrated circuit 400 Alternative modulation techniques for the oscillator start-stop mode may be possible.

The modulated feedback signal at pin 11 of NOR gate 452 is coupled to first inverter 453. The output of first inverter 453 is coupled to a second inverter 455 and to capacitor 309. In the embodiment of the invention illustrated in FIG. 4 inverters 453 and 455 are implemented by NOR gates. As those of ordinary skill in the art will readily appreciate, a wide variety of logic circuits are suitable for implementing inverter circuits 453 and 455. The invention is not limited to implementations comprising NOR gates.

Inverters 455 and 453 are coupled to isolating capacitors 307 and 309 respectively. Isolating capacitors 307 and 309 couple the modulated feedback information to demodulator 305. Capacitors 307 and 309 are provided on a portion of monolithic integrated circuit 400. Inverter 455 is configured to charge and discharge capacitor 307 in inverse relationship to the charging and discharging of capacitor 309 by inverter 453

The other side of capacitor 307 is coupled to a first input of demodulator 305. Similarly, the other side of capacitor 309 is coupled to a second input of demodulator 305. Demodulator 305 comprises a transistor 325 and rectifiers 302 and 301. The modulated feedback signal provided by capacitors 307 and 309 is rectified by the base-emitter junction of transistor 325 and diode 301 and produces a collector current in transistor 325. The collector current in transistor 325 discharges capacitor C3 when oscillator 20 produces current pulses in capacitors 307 and 309. Capacitor C3 is charged by a current source provided internal to monolithic integrated circuit 400, when no current pulses are produced in capacitors 307 and 309.

When feedback signal 313 on the third pin drops below the device 319 threshold, indicating that voltage Vout is too low, capacitor C3 is charged causing signal 156 to increase the current of transistor 151. On the other hand, when feedback signal 313 on the third pin rises above the device 319 threshold, indicating that voltage Vout is too high, capacitor C3 is discharged by the pulses in capacitors 307 and 309 causing signal 156 to decrease the current of transistor 151. Thereby, voltage regulation loop is established.

FIG. 5

Figure 5:
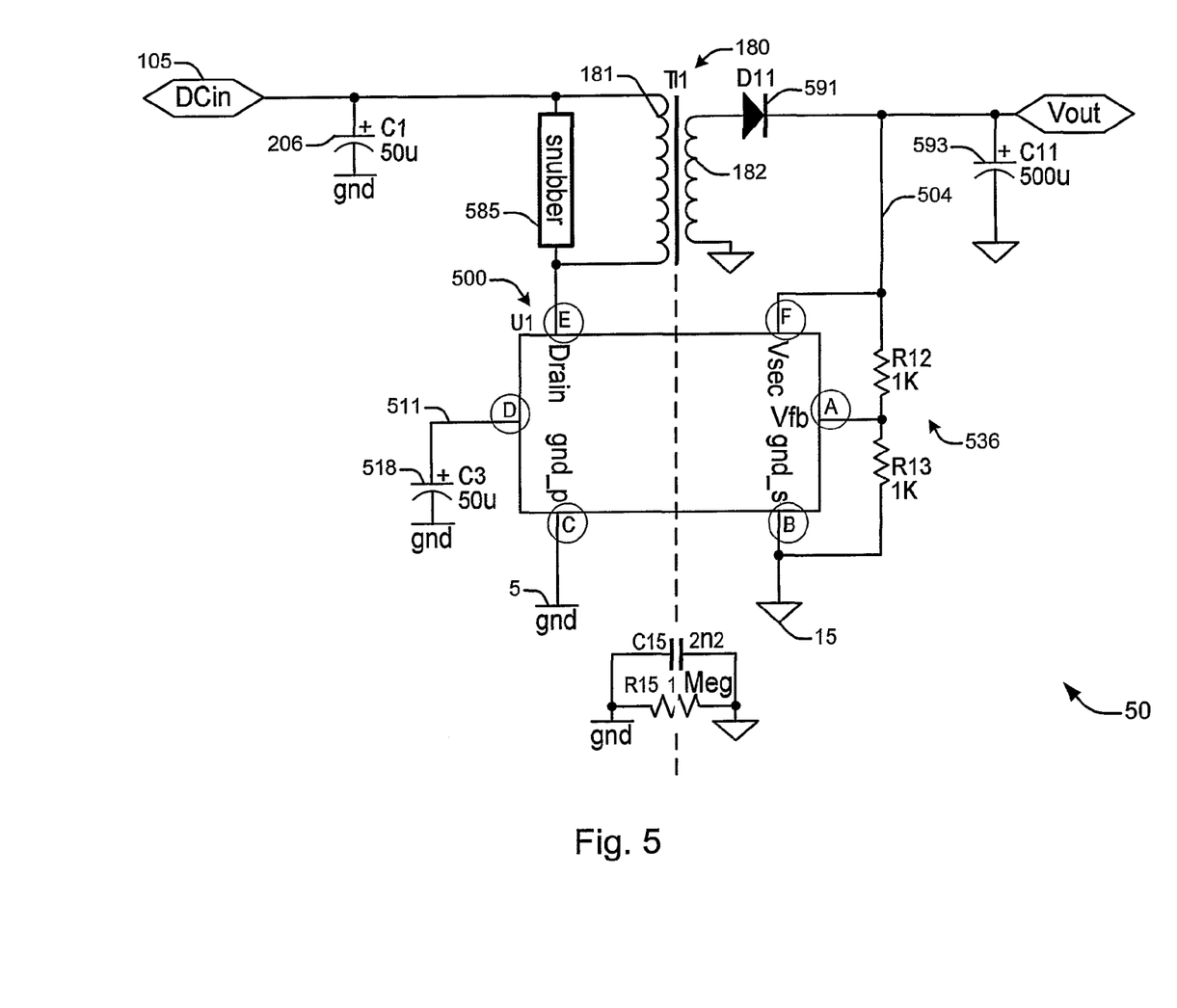
FIG. 5 is a block diagram of a DC to DC converter according to an embodiment of the invention.

FIG. 5 illustrates power supply device 50 according to an embodiment of the invention. Power supply device 50 comprises a transformer circuit 180 coupled to monolithic integrated circuit 500. According to the embodiment of the invention illustrated in FIG. 5 monolithic integrated circuit 500 comprises a six pin IC chip. Output voltage Vout is provided to a feedback circuit 536 comprising a voltage divider (R12, R13). This voltage divider could be implemented partially or complete in the IC as well. External resistor R12 allows more flexibility. Feedback circuit 536 provides a feedback signal 313 to monolithic integrated circuit 500. Terminal A of monolithic integrated circuit 500 couples the feedback 313 signal to a diode 319 of a modulator (see 303 of FIG. 4).

Table 1 describes the functions of pins 1-8 of monolithic integrated controller 100.

TABLE I

| Pin | Signal | Function | Description |
| --- | --- | --- | --- |
| A | Level indicating signal | Indicate level of second DC signal 195 | level of DC signal varies with load - |
| B | Second common potential | Chassis ground | Common for secondary side of transformer |
| C | First common potential | Earth ground | Common for primary side of transformer |
| D | Vcc capacitor | for supplying Vcc to the IC. Is charged via current source from, for example, an additional winding of transformer 180. | |
| E | Pulse modulated switch signal | Switch current through primary providing secondary side Vcc of IC | Provides regulation of output Vout |
| F | Coupled to Vout | | |

Thus various embodiments of the invention described herein provide a single chip power supply monolithic integrated circuit with integrated secondary side regulation and hot side isolation. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

The invention claimed is:
1. A power supply, comprising:
a source of an unregulated input supply voltage referenced to a first common conductor potential:
a controllable output transistor coupled to said input supply voltage source for generating from said input supply voltage an output supply voltage referenced to a second common conductor potential;
a modulator comprising a start-stop oscillator responsive to said output supply voltage for generating a feedback signal at a first frequency, said feedback signal containing error level information derived from said output supply voltage; and a first capacitance for capacitively coupling said feedback signal to said transistor to regulate said output supply voltage, said first capacitance forming an isolation barrier in a feedback signal path extending from said output supply voltage to said transistor that isolates between said first and second common conductor potentials.

2. A power supply according to claim 1, wherein said first capacitance comprises a discrete component.

3. A power supply according to claim 1, wherein said first capacitance is included in an integrated circuit that further includes semi-conductors.

4. A power supply according to claim 1, wherein said isolation barrier is formed with respect to signals at frequencies lower than said first frequency.

5. A power supply according to claim 1, further comprising a second capacitance, wherein said start-stop oscillator further generates a second alternating current feedback signal that is capacitively coupled via said second capacitance to said transistor to provide differential drive in said feedback signal path that provides said isolation barrier.

6. A power supply according to claim 1 wherein said transistor is coupled to an isolation transformer to form between a terminal where said input supply voltage is generated and a terminal where said output supply voltage is generated an isolation barrier that isolates said first common conductor potential from said second common conductor potential.

7. A power supply according to claim 1, further comprising a demodulator responsive to said capacitively coupled feedback signal and coupled to said transistor to regulate said output supply voltage.

8. A power supply according to claim 7, wherein said demodulator comprises a diode junction.

9. A power supply according to claim 7, wherein said demodulator further comprises a low pass filter capacitor.

* * * * *